March 18, 1941.  H. J. GRAMATZKI  2,235,364
AFOCAL CAMERA LENS ATTACHMENT
Filed June 3, 1939
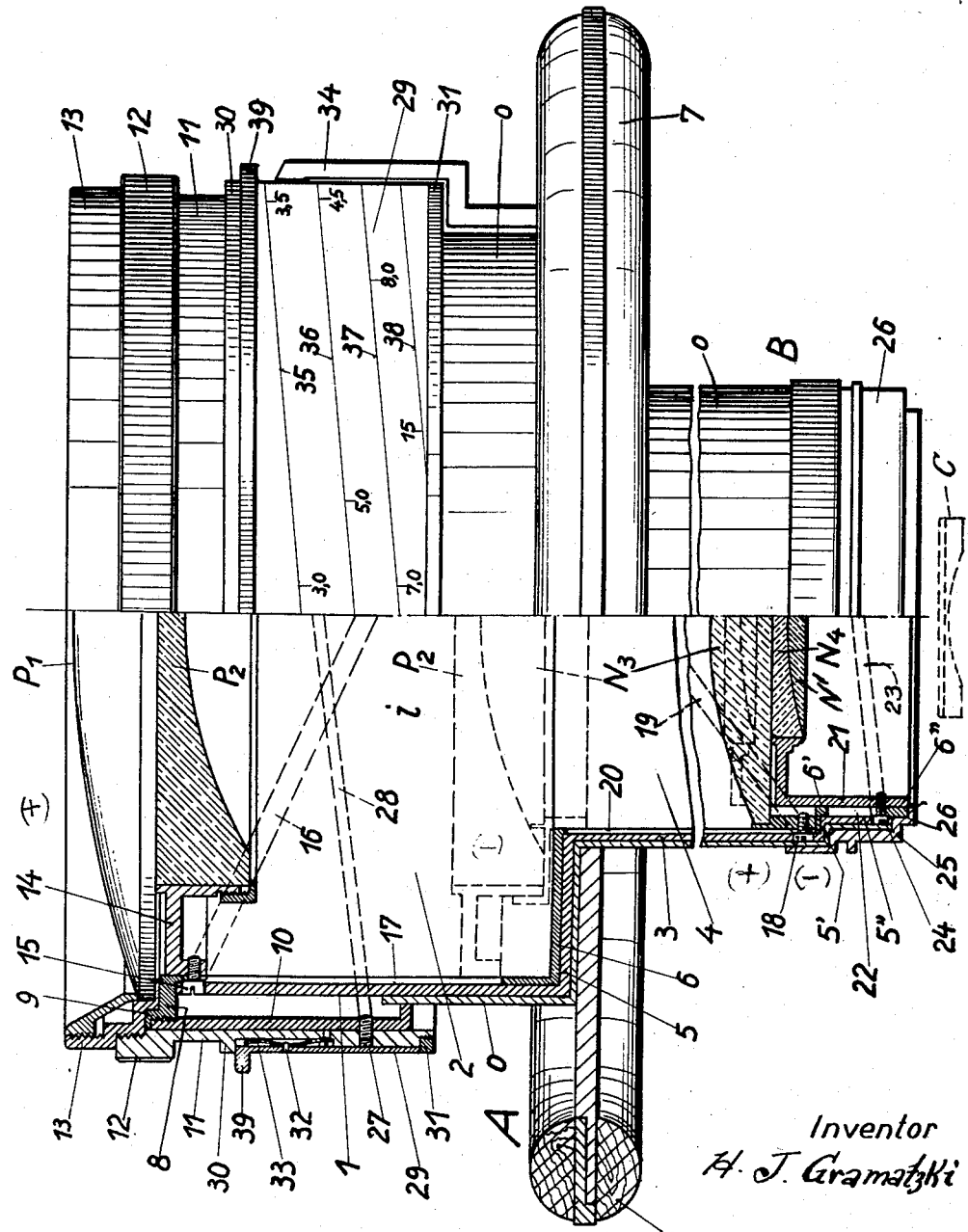
Inventor
H. J. Gramatzki
By: Glascock Downing & Seeby
Attorney Patented Mar. 18, 1941

2,235,364

UNITED STATES PATENT OFFICE 2,235,364

AFOCAL CAMERA LENS ATTACHMENT

Hugh John Gramatzki, Berlin-Zehlendorf, Germany

Application June 3, 1939, Serial No. 277,290
In Germany March 24, 1935

7 Claims. (Cl. 88—57)

My invention relates to an afocal camera lens attachment of the kind described in my co-pending application Ser. No. 41,796, filed September 23, 1935.

In an attachment of this type, optical means for varying the focal length of the camera lens, or objective, is arranged to move between a front and a rear lens.

Such optical means may be a single movable lens P2, as illustrated in Figs. 3, 4, and 9 of my said co-pending application, or it may be a pair of lenses, P2 and N3, arranged to move with respect to each other between the front and the rear lens, as illustrated in Figs. 7 and 8 of the said application.

With an attachment of the type described, it is possible to produce satisfactory pictures, provided that the objective of the camera has very narrow diaphragm opening, and correspondingly great depth of focus. If this condition is not fulfilled, satisfactory pictures cannot be produced.

It is an object of my present invention to so improve an attachment of the kind described that it will produce pictures of satisfactory definition without being restricted to a narrow diaphragm opening.

To this end, in combination with a front lens, a rear lens, and optical means for varying the focal length of the camera objective arranged to move between the two lenses, I provide means for moving the focal-length varying means between the two lenses, and the rear lens away from the front lens.

By these means, the aberration is corrected and pictures of satisfactory definition are produced.

It is another object of my invention to provide means for correcting astigmatism.

To this end, I make the movable rear lens of a concave and a convex lens cemented together, the concave surface of the concave lens being arranged to face the objective of the camera.

It is still another object of my invention to provide means for focussing the attachment.

To this end, I so design the lens-moving means that the front lens of the attachment is moved in opposite direction to the movement imparted to the rear lens.

It is still another object of my invention to provide means for increasing the adaptability of the attachment.

To this end, I provide means for exchanging the front lens, and a scale for each exchangeable front lens.

In the accompanying drawing, an attachment embodying my invention is illustrated by way of example, partly in axial section and partly in elevation.

Referring now to the drawing, this attachment is of the type in which the focal-length varying means, as illustrated in Figs. 7 and 8 of my said co-pending application, includes a negative lens P2 facing the positive front lens P1, and a positive lens N3 facing the negative rear lens N4.

The attachment A which is placed in front of the camera lens, or objective, C in axial alignment, comprises an inner or lens-supporting tube *i*, and an outer or lens-operating tube *o* which is mounted to rotate on the inner tube *i*. Both tubes are of similar configuration. The outer tube *o* comprises a larger front portion 1, a smaller rear portion 3, a front flange 5 connecting the two portions, a rear flange 5', and a reduced end portion 5''. This is mounted to rotate in a bearing 25 by which the attachment is supported to the camera having the lens C. The inner tube *i* comprises a larger front portion 2, a smaller rear portion 4, a front flange 6, a rear flange 6', and a reduced end portion 6''. A male thread 26 at the rear end of the end portion 6'' is inserted in a female thread in the bearing 25, holding the inner tube *i* against rotation on the camera while the outer tube *o* is rotated on the inner tube *i* by a handle 7.

A flange 8 at the front end of the inner or stationary tube *i* projects beyond the front end of the outer or rotary tube *o*. A threaded spigot 9 on the flange 8 supports the front end of a sleeve 10 which surrounds the larger front portion of the outer tube *o* in spaced relation. A scale-supporting cylinder 11 with a knurled flange 12 at its front end is mounted to slide on the sleeve 10, and a holder for the front lens P1 is inserted in the threaded front end of the scale-supporting cylinder 11.

The negative lens P2 of the focal-length varying means is mounted in a holder 14 sliding in the front portion 2 of the inner tube *i*. A screw 15 on the holder engages in a helical slot 16 in the outer tube *o* with its head, and the shank of the screw 15 is guided in parallel relation to the axis of the attachment by a slot 17 in the inner tube *i*.

When the handle 7 on the outer tube *o* is rotated, the lens P2 is shifted in axial direction between its final position at the front (full lines) and its final position at the rear (dotted lines) in which its holder 14 is on the front flange 6 of the outer tube *o*.

The positive intermediate lens N3 which is the other member of the focal-length varying means, is mounted to slide in the smaller rear portion 4 of the inner tube $i$ with its holder B, a headed screw 18 in the holder engaging in a helical slot 19 in the smaller rear portion 3 of the outer tube $o$, its shank being guided in parallel relation to the axis of the attachment by a slot 20 in the portion 4 of the inner tube $i$. The slot 20 extends as far as the rear flange 6' of the inner tube.

The rear lens N4 is mounted to slide in the end portion 6'' of the inner tube $i$ with its holder 21, and a headed screw 24 engages in a slot 22 in the end portion 6'' by which the holder 21 is guided in parallel relation to the axis of the attachment. The head of the screw 27 engages in a slot 23 in the rear end 5'' of the outer tube $o$, so that the lens N4 is shifted when the outer tube $o$ is rotated on the inner tube $i$.

The normal position of the rear lens N4 is shown in dotted lines in the drawing. Since the slots 19 and 23 are inclined oppositely, the rear lens N4 moves to the rear upon rotation of the outer tube $o$ by its handle 7 and arrives in the position shown in full lines when the rear lens N3 of the focal-length varying means is in its final position at the rear, as shown in full lines.

Astigmatism is corrected by cementing a convex lens N' against the concave side of the rear lens N4 which faces the objective C, as shown.

The means for focussing the front lens P1 will now be described. A screw 27 in the scale-supporting cylinder 11 engages in a helical slot 28 in the sleeve 10 which, as will be remembered, is positively connected to the inner tube $i$ by the flange 8 and the spigot 9, and means, not shown, like the slots 17 and 20, are provided for guiding the screw in parallel to the axis of the attachment. By these means, the scale-supporting cylinder 11 and the front lens P1 are shifted upon rotation of the handle 7.

A scale 29 is placed on the cylinder 11 between a flange 30 and a nut 31 and is equipped with a knurled flange 39 for rotating it on the cylinder 11. As mentioned, the front lens P1 is exchangeable. In the present instance, it has been assumed that four exchangeable lenses are provided for the attachment, and corresponding range curves 35 to 38 are marked on the scale 29, the distances between which the front lens can be used, being indicated in metres. Thus, the front lens P1 corresponding to the topmost curve 35 can be used for a range of 3.5 to 2.5 metres, and the front lens P1 corresponding to the lowermost curve 38 from "infinite" to 15 metres.

A spring catch 32, 33 is arranged to engage in a hole in the scale 29 when the origo of one of the curves on the scale 29 is opposite an indicator 34 on the handle 7.

The following theoretical considerations are presented:

The shifting of the lenses constituting the focal-length varying means, i. e., the lenses P2 and N3, changes the magnification or minification rate of the attachment, and such change must not interfere with the definition of the virtual image the attachment produces. The first three lenses P1, P2, and N3 of the attachment produce a real image which the last lens N4 converts into a virtual one. The real image is at the rear of the first three lenses and the virtual image it is converted into by the last lens is projected forwardly for a distance which in theory is infinite but in practice and with an attachment having a fixed rear lens, is so short that the virtual image lacks definition. This defect is called the "aberration," and its cause is that the point of convergence of the rays issuing from the first three lenses travels forwards for a short distance as the intermediate lenses P2 and N3 are shifted, and is then reversed and travels to the rear. This aberration is made up for by moving the last lens N4 in the same direction.

By the shifting of the intermediate lenses P2 and N3, the focal length of the objective 1 is varied, as described, and this interferes with the definition of the image. This is made up for by the automatic means operatively connected to the screw 27 effecting focussing of the front lens P1.

The focussing which is possible in this way, however, is limited since the front lens P1 must not be shifted forwards too far as this would reduce the diameter of its field, and therefore the front lens P1 is made exchangeable.

The calculation of an attachment according to my invention is as follows: It is based upon a factor M which is the rate of variation of focal length obtainable by the shifting of the two intermediate lenses P2 and N3, and the constants of the system are all functions of $m$, the square root of M. The system has two positive lenses P1 and N3, and two negative lenses P2 and N4 whose focal lengths are as follows:

$$P1: f_1$$

$$N3: f_3 = \frac{1}{m+1} f_1$$

$$P2: f_2 = -f_3$$

$$N4: f_4 = -\frac{1}{m} f_1$$

The total length of the system is $$L = \frac{m-1}{m} f_1$$

If, for instance, L=134.6 millimetres, and the distance traveled by each of the intermediate lenses P2 and N3=67.3 mm., the negative rear lens N4 moves from the dotted-lines into the full-lines position for 9.3 millimetres. This makes up for the aberration, as described.

With a system of this type, the maximum value of the factor M is 2.

A factor M=3 can be obtained by making $m$ the fourth root from M.

In this case, if the focal length of lens P1 is $f_1$, the other focal lengths will be as follows:

$$f_2 = \frac{1}{m+1} f_1$$

$$f_3 = \frac{m}{m+1} f_1$$

$$f_4 = f_1$$

It will appear that in this system, for the same values of M and $f_1$ as in the first example, the focal lengths $f_2$ and $f_3$ are greater than in the first example, which is favorable for the reduction of optical defects.

I claim:

1. A telescopic attachment for camera lenses for altering the equivalent focal length comprising, a positive front lens and a negative rear lens, two intermediate lenses having equal focal length and enclosed between said front lens and said rear lens, one of said intermediate lenses being negative and arranged next to the front lens, the other intermediate lens being positive and arranged next to the rear lens, operating means adapted to shift said intermediate lenses in axial directions, the distance between front and rear lens being equal to the focal length of the front lens divided by a factor equal to the square root of the factor indicating the total change of focal distance multiplied by the same factor less the unit, the focal length of the negative intermediate lens being equal to the focal length of the front lens divided by the same factor increased with the unit, the focal length of the negative rear lens being equal to that of the front lens divided by said factor, said negative lens consisting of two members cemented together forming a collecting cemented surface showing its convex side against the incident light and operatively connected to said operating means so as to be moved for a short distance towards the front lens in linear relation to the movement of the intermediate lenses.

2. A telescopic attachment for camera lenses for altering the equivalent focal length comprising, a positive front lens and a negative rear lens, said front lens being mounted in a focussing mount which is provided with a scale, two intermediate lenses having equal focal length and enclosed between said front lens and said rear lens, one of said intermediate lenses being negative and arranged next to the front lens, the other intermediate lens being positive and arranged next to the rear lens, operating means adapted to shift said intermediate lenses in axial directions, the distance between front and rear lens being equal to the focal length of the front lens divided by a factor equal to the square root of the factor indicating the total change of focal distance multiplied by the same factor less the unit, the focal length of the negative intermediate lens being equal to the focal length of the front lens divided by the same factor increased with the unit, the focal length of the negative rear lens being equal to that of the front lens divided by said factor, said negative lens consisting of two members cemented together forming a collecting cemented surface showing its convex side against the incident light and operatively connected to said operating means so as to be moved for a short distance towards the front lens in linear relation to the movement of the intermediate lenses.

3. A telescopic attachment for camera lenses as claimed in claim 2 wherein the front lens is arranged in the mount so as to be exchanged, and the mount is provided with several focussing scales, and said scales corresponding to the exchangeable lenses which are used.

4. A telescopic attachment for camera lenses for altering the equivalent focal length comprising, a positive front lens and a negative rear lens of equal focal length, two intermediate lenses enclosed between said front lens and said rear lens, one of said intermediate lenses being negative and arranged next to the front lens, the other intermediate lens being positive and arranged next to the rear lens, operating means adapted to shift said intermediate lenses in axial directions, the distance between the front and the rear lens being equal to the focal length of the front lens divided by a factor equal to the fourth root of the factor indicating the total change of focal distance multiplied by the square of the same factor less the unit, the focal length of the enclosed negative lens being equal to the focal distance of the front lens divided by the same factor increased with the unit, the focal length of the enclosed positive lens being equal to that of the enclosed negative lens multiplied with the named factor, and the ratio of movement of the enclosed positive lens to that of the enclosed negative lens being equal to said factor.

5. A telescopic attachment for camera lenses for altering the equivalent focal length comprising, a positive front lens and a negative rear lens of equal focal length, two intermediate lenses enclosed between said front lens and said rear lens, one of said intermediate lenses being negative and arranged next to the front lens, the other intermediate lens being positive and arranged next to the rear lens, operating means adapted to shift said intermediate lenses in axial directions, the distance between front and rear lens being equal to the focal length of the front lens divided by a factor equal to the fourth root of the factor indicating the total change of focal distance multiplied by the square of the same factor less the unit, the focal length of the enclosed negative lens being equal to the focal distance of the front lens divided by the same factor increased with the unit, the focal length of the enclosed positive lens being equal to that of the enclosed negative lens multiplied with the named factor, the ratio of movement of the enclosed positive lens to that of the negative lens being equal to said factor, and the negative rear lens being movable for a short distance equal to about 7% of the whole distance between front and rear lens towards the front lens in linear relation to the movement of the enclosed lenses.

6. A telescopic attachment for camera lenses for altering the equivalent focal length comprising, a positive front lens and a negative rear lens of equal focal length, two intermediate lenses enclosed between said front lens and said rear lens, one of said intermediate lenses being negative and arranged next to the front lens, the other intermediate lens being positive and arranged next to the rear lens, operating means adapted to shift said intermediate lenses in axial directions, the distance between front and rear lens being equal to the focal length of the front lens divided by a factor equal to the fourth root of the factor indicating the total change of focal distance multiplied by the square of the same factor less the unit, the focal length of the enclosed negative lens being equal to the focal distance of the front lens divided by the same factor increased with the unit, the focal length of the enclosed positive lens being equal to that of the enclosed negative lens multiplied with the named factor, the ratio of movement of the enclosed positive lens to that of the negative lens being equal to said factor, and the negative rear lens consisting of two members cemented together forming a collecting cemented surface showing its convex side against the incident light.

7. A telescopic attachment for camera lenses for altering the equivalent focal length comprising, a positive front lens and a negative rear lens of equal focal length, two intermediate lenses enclosed between said front lens and said rear lens, one of said intermediate lenses being negative and arranged next to the front lens, the other intermediate lens being positive and arranged next to the rear lens, operating means adapted to shift said intermediate lenses in axial directions, the distance between front and rear lens being equal to the focal length of the front lens divided by a factor equal to the fourth root of the factor indicating the total change of focal distance multiplied by the square of the same factor less the unit, the focal length of the enclosed negative lens being equal to the focal distance of the front lens divided by the same factor increased with the unit, the focal length of the enclosed positive lens being equal to that of the enclosed negative lens multiplied with the factor, the ratio of movement of the enclosed positive lens to that of the negative lens being equal to said factor, the negative rear lens consisting of two members cemented together forming a collecting cemented surface showing its convex side against the incident light and this lens being movable for a short distance approximately equal to 7% of the distance between front and rear lens towards the front lens in linear relation to the movement of the enclosed lenses.

HUGH JOHN GRAMATZKI.